(12) United States Patent
Yu et al.

(10) Patent No.: US 7,626,782 B1
(45) Date of Patent: Dec. 1, 2009

(54) DISK DRIVE EMPLOYING ITERATIVE LEARNING CONTROL FOR TUNING SEEK SERVO LOOP

(75) Inventors: Jie Yu, Irvine, CA (US); Kuang-Yang Tu, Irvine, CA (US); Young-Hoon Kim, Cupertino, CA (US); Wei Xi, Lake Forest, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 0 days.

(21) Appl. No.: 12/178,512

(22) Filed: Jul. 23, 2008

(51) Int. Cl.
*G11B 5/596* (2006.01)
(52) U.S. Cl. .................... 360/78.04; 360/77.04
(58) Field of Classification Search ........... None
See application file for complete search history.

(56) References Cited

U.S. PATENT DOCUMENTS

| | | | |
|---|---|---|---|
| 6,563,663 B1 | 5/2003 | Bi et al. | |
| 6,636,377 B1 | 10/2003 | Yu et al. | |
| 6,686,716 B1 | 2/2004 | Predina et al. | |
| 6,999,267 B1 | 2/2006 | Melkote et al. | |
| 7,283,321 B1 * | 10/2007 | Sun et al. ........... | 360/78.05 |
| 7,298,574 B1 | 11/2007 | Melkote et al. | |

OTHER PUBLICATIONS

Yang Quan Chen, Kevin L. Moore, Jie Yu, Tao Zhang, "Iterative Learning Control and Repetitive Control in Hard Disk Drive Industry—A Tutorial", Proceedings 2006 IEEE Conference on Decision and Control, San Diego, CA, Dec. 2006.
Mingxuan Sun, Danwei Wang, "Closed-loop iterative learning control for non-linear systems with initial shifts", International Journal of Adaptive Control Signal Processing, 16(7), 2002, pp. 515-538.
Douglas A. Bristow, Marina Tharayil, Andrew G. Alleyne, "A Survey of Iterative Learning Control A learning-based method for high-performance tracking control", IEEE Control Systems Magazine, Jun. 2006, vol. 26: pp. 96-114.

* cited by examiner

*Primary Examiner*—K. Wong
(74) *Attorney, Agent, or Firm*—Howard H. Sheerin, Esq.

(57) ABSTRACT

A disk drive is disclosed operable to seek a head from a first radial location over a disk to a second radial location over the disk. A reference signal is initialized, a feed-forward control signal is initialized, and a seek is initiated. During the seek operation, a position error signal (PES) is generated and saved, wherein the PES represents a position error of the head relative to the reference signal. The PES is filtered with a compensation filter to generate a feed-back control signal. The feed-back control signal is combined with the feed-forward control signal to generate a VCM control signal. When the seek is done, the saved PES is processed using an iterative learning control (ILC) algorithm to adjust at least one of the reference signal and the feed-forward control signal.

18 Claims, 5 Drawing Sheets

$$Uffwd\_\{n+1\}(z) = Qu(z)[Uffwd\_\{n\}(z) + Lu(z)PES\_\{n+1\}(z)]$$

$$Lu(z) = \frac{\sigma_{re}^2}{n \cdot \sigma_{re}^2 + \sigma_{ne}^2} \; TRC0(z)^{-1}$$

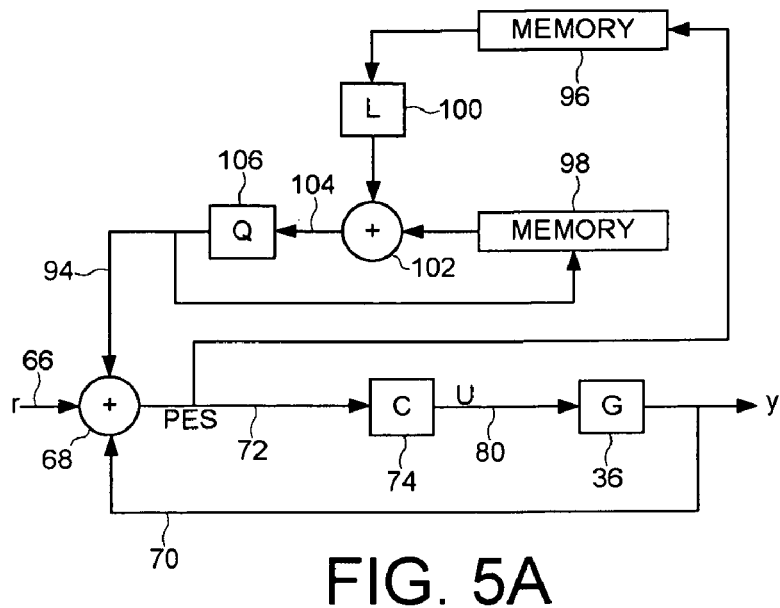
FIG. 5A
$$R_{n+1}(z) = Q_r(z)[R_n(z) + L_r(z)PES_{n+1}(z)]$$
FIG. 5B
$$L_r(z) = \frac{\sigma_{re}^2}{n \cdot \sigma_{re}^2 + \sigma_{ne}^2} \; ERC0(z)^{-1}$$
FIG. 5C
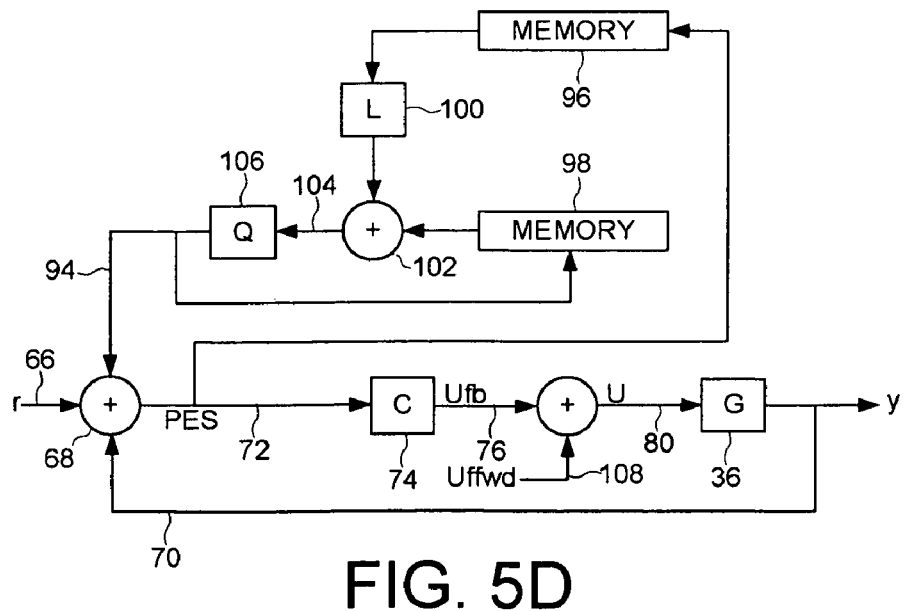
FIG. 5D

US 7,626,782 B1

DISK DRIVE EMPLOYING ITERATIVE LEARNING CONTROL FOR TUNING SEEK SERVO LOOP

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the velocity of the actuator arm as it seeks from track to track.

FIG. 1 shows a prior art disk format 2 as comprising a number of data tracks 6 defined by servo sectors $4_0$-$4_N$ recorded around the circumference of each data track. Each servo sector $4_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a track address, used to position the head over a target data track during a seek operation. Each servo sector $4_i$ further comprises groups of servo bursts 14 (e.g., A, B, C and D bursts), which comprise a number of consecutive transitions recorded at precise intervals and offsets with respect to a data track centerline. The groups of servo bursts 14 provide fine head position information used for centerline tracking while accessing a data track during write/read operations.

FIG. 2 shows a conventional closed loop feed-back system for generating a control signal U 16 applied to the VCM 18 in order to seek the head to a target data track. The current position of the head y is compared to a reference position r in order to generate a position error signal (PES) 20. The PES 20 is filtered by a compensation filter C 22 to generate a feed-back control signal Ufb 24 which is added to a feed-forward control signal Uffwd 26 to generate the VCM control signal U 16. The feed-forward control signal Uffwd 26 is generated by filtering the reference signal r with an inverse filter 28 having an impulse response that models the inverse response of the VCM 18. If the inverse filter 28 models the inverse response of the VCM 18 exactly, then the feed-back control signal Ufb 24 will be zero. That is, the feed-forward signal Uffwd 26 will cause the VCM 18 to move the head to follow exactly the reference signal r so that the PES 20 is zero.

It is difficult to design the inverse filter 28 to exactly model the inverse of the VCM 18 due to design variations across VCMs, such as variations in the resonance profile and the torque factor Kt. In addition, certain VCM parameters may vary over time, for example, the torque factor Kt may vary with temperature fluctuations.

BRIEF DESCRIPTION OF THE DRAWINGS

FIG. 5A shows control circuitry according to an embodiment of the present invention for adjusting a reference signal using an ILC algorithm.

FIG. 5B shows an equation for adjusting the reference signal using an ILC algorithm according to an embodiment of the present invention.

FIG. 5C a learning function according to an embodiment of the present invention including an inverse of a error rejection curve ERC(z) for the VCM.

FIG. 5D shows control circuitry according to an embodiment of the present invention wherein a feed-forward control signal is employed in addition to the reference signal adjusted using an ILC algorithm.

DETAILED DESCRIPTION OF EMBODIMENTS OF THE INVENTION

Figure 1:
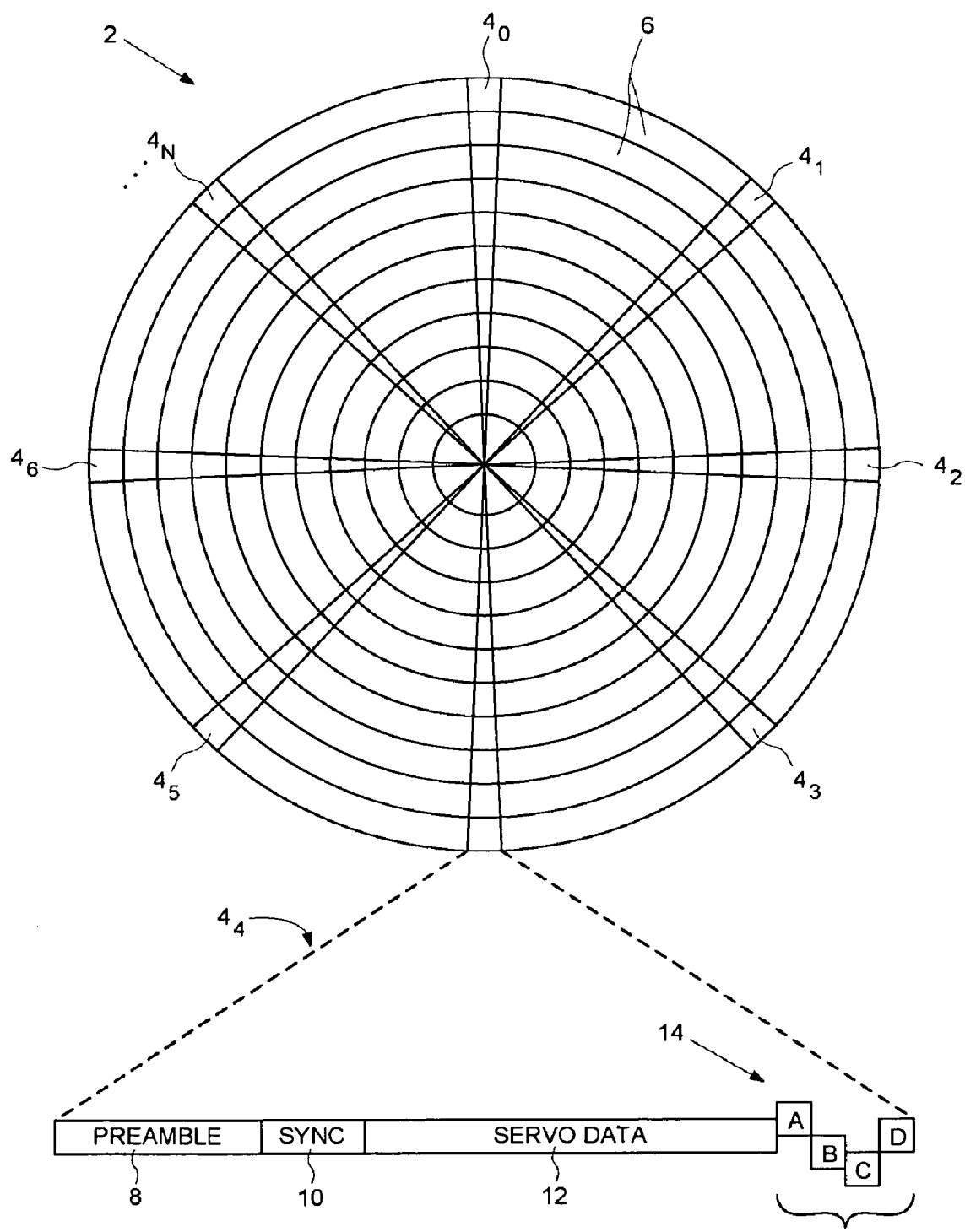
FIG. 1 shows a prior art disk format comprising a plurality of data tracks defined by embedded servo sectors.
Figure 2:
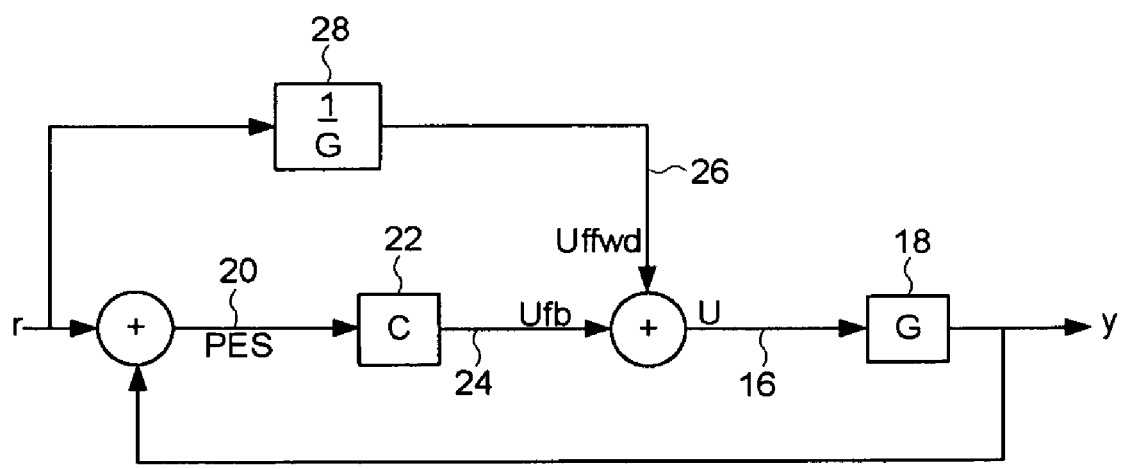
FIG. 2 shows prior art control circuitry for seeking the head in a disk drive, including to generate a feed-back and a feed-forward control signal.
Figure 3A:
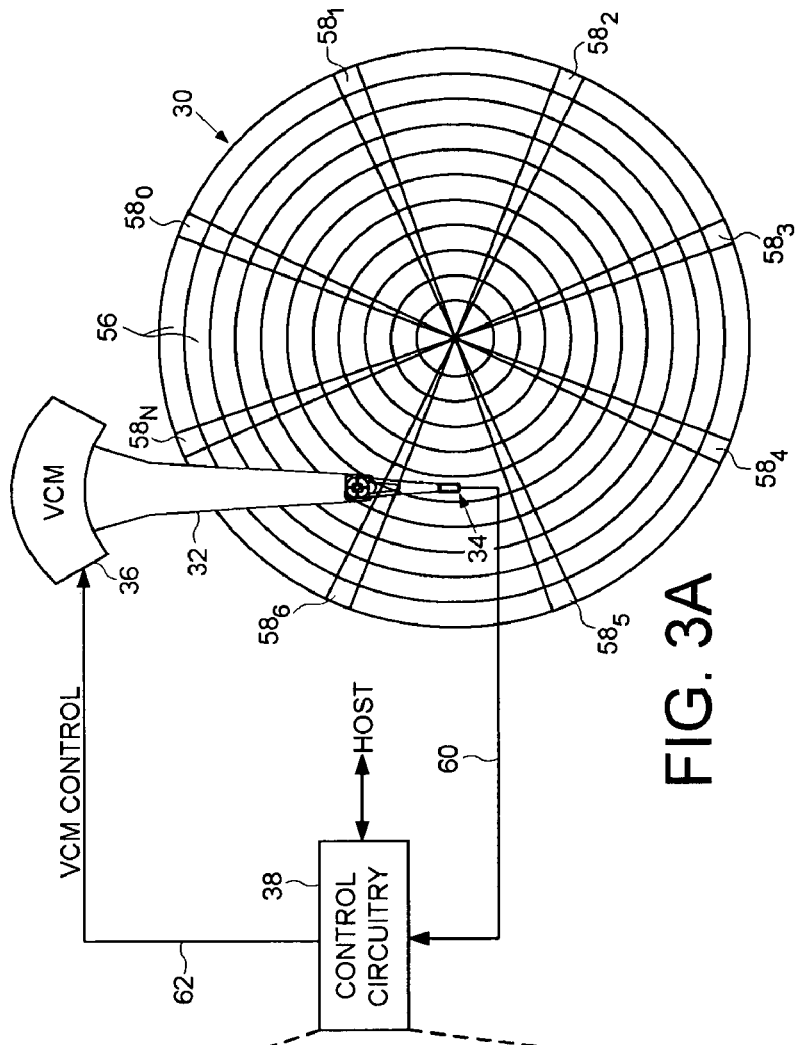
FIG. 3A shows a disk drive according to an embodiment of the present invention comprising a head actuated over a disk by a voice coil motor.
Figure 3B:
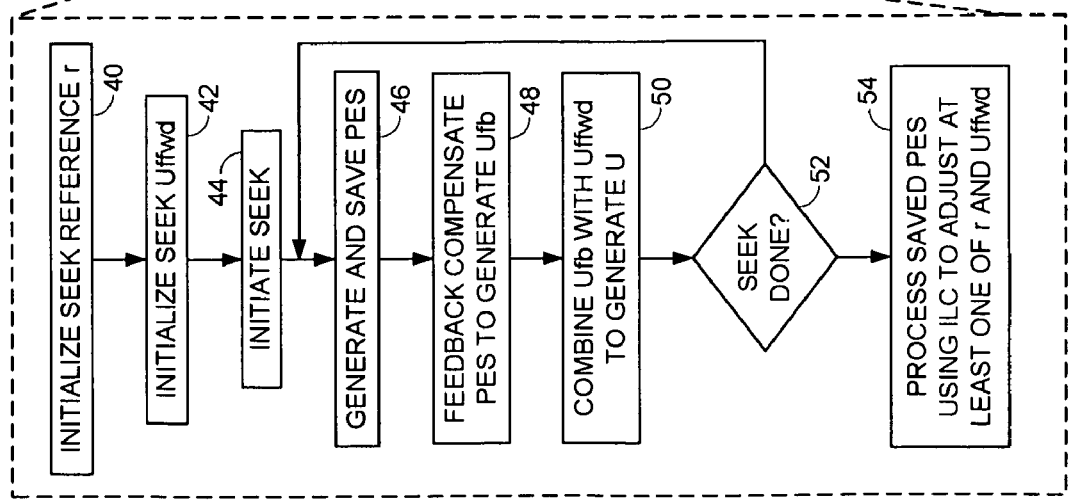
FIG. 3B is a flow diagram according to an embodiment of the present invention wherein an iterative learning control (ILC) algorithm is employed to adjust at least one of a reference signal and a feed-forward control signal for seeking the head.

FIG. 3A shows a disk drive according to an embodiment of the present invention comprising a disk 30, an actuator arm 32, a head 34 coupled to a distal end of the actuator arm 32, and a voice coil motor (VCM) 36 for rotating the actuator arm 32 about a pivot. The disk drive further comprises control circuitry 38 operable to seek the head 34 from a first radial location over the disk 30 to a second radial location over the disk 30 by executing the flow diagram of FIG. 3B. A reference signal is initialized (step 40), a feed-forward control signal is initialized (step 42), and a seek is initiated (step 44). During the seek operation, a position error signal (PES) is generated and saved (step 46) wherein the PES represents a position error of the head relative to the reference signal. The PES is filtered with a compensation filter to generate a feed-back control signal (step 48). The feed-back control signal is combined with the feed-forward control signal to generate a VCM control signal (step 50). When the seek is done (step 52), the saved PES is processed using an iterative learning control (ILC) algorithm to adjust at least one of the reference signal and the feed-forward control signal (step 54).

In the embodiment of FIG. 3A, the disk 30 comprises a plurality of data tracks 56 defined by a plurality of embedded servo sectors $58_0$-$58_N$. When the control circuitry 38 seeks the head 34 from a current data track to a target data track, the embedded servo sectors $58_0$-$58_N$ are processed in order to generate the PES relative to the reference signal. For example, the control circuitry 38 may generate the PES as a current position of the head relative to a target position of the head during the seek operation, or the control circuitry 38 may generate the PES as a current velocity of the head relative to a target velocity of the head during the seek operation.

The control circuitry 38 processes a read signal 60 emanating from the head 34 in order to demodulate the embedded servo sectors $58_0$-$58_N$. As the head 34 passes over one of the servo sectors $58_i$, the control circuitry 38 generates the VCM control signal 62 by combining a feed-back control signal with a feed-forward control signal, wherein after the seek operation, the control circuitry adjusts at least one of the reference signal and/or the feed-forward control signal using an ILC algorithm.

An ILC algorithm typically improves a control system that performs a repetitive task by adjusting control parameters based on past iterations. In the case of a disk drive, the control circuitry performs the repetitive task of seeking the head from a current data track to a target data track. In one embodiment, the control circuitry employs a reference control signal in the form of a seek profile (e.g., a velocity profile) corresponding to each seek length. Therefore, for each seek length, the control circuitry generates a corresponding reference control signal and a corresponding feed-forward control signal, wherein after each seek operation of a particular seek length, at least one of the reference control signal and/or the feed-forward control signal is adjusted using an ILC algorithm.

Figures 4A, 4B, 4C:
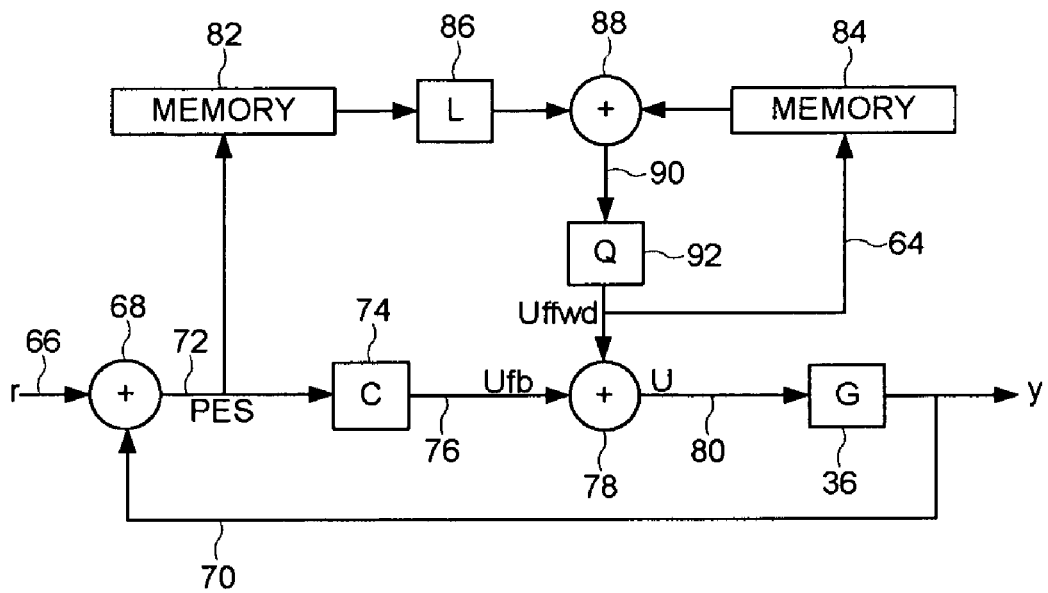
FIG. 4A shows control circuitry according to an embodiment of the present invention for adjusting a feed-forward control signal using an ILC algorithm.
FIG. 4B shows an equation for adjusting the feed-forward control signal using an ILC algorithm according to an embodiment of the present invention.
FIG. 4C shows a learning function according to an embodiment of the present invention including an inverse of a torque rejection curve TRC(z) for the VCM.

FIG. 4A shows an embodiment of the present invention wherein the control circuitry adjusts a feed-forward control signal 64 using an ILC algorithm after each seek operation. In this embodiment, the reference control signal 66 is predetermined based on suitable performance criteria (such as resonance excitation). For example, the reference control signal 66 may be predetermined for a family of disk drives based on design parameters of the VCM 36 and then employed in every production disk drive. In one embodiment, the reference control signal 66 is optimized during a design phase according to:

min_{r,u}max_{all considered G}{K_r*||r−r_target||+ K_e*||r−G*u||+K_u||u||} where r_target is the original desired position reference signal. The first term in the cost function captures the deviation of the final reference signal r from its target. The second term captures the feed-forward error, and the last term captures the size of the feed-forward control (and its slew rate can be incorporated if needed). K_r, K_e and K_u are properly selected weighting functions to tradeoff the target following accuracy and the feed-forward magnitude/smoothness.

Referring again to FIG. 4A, during a seek operation of a given seek length, a reference control signal 66 is compared 68 to an estimated position 70 of the head to generate a position error signal (PES) 72. The PES 72 is filtered by a compensation filter C 74 to generate a feed-back control signal 76. The feed-back control signal 76 is combined 78 with a feed-forward control signal 64 to generate a VCM control signal 80 applied to the VCM G 36. The PES 72 generated at each servo sector is saved in a first memory location 82 and the feed-forward control signal 64 is saved in a second memory location 84. The PES 72 saved in the first memory location 82 is filtered by a learning function Lu 86 and combined 88 with the feed-forward control signal 64 saved in the second memory location 84. The result 90 of the combination is filtered by a Q-filter 92 Qu which determines which frequencies are emphasized in the learning process. In one embodiment, the Q-filter 92 is simply one (no effect), and in an alternative embodiment, the Q-filter 92 is an ideal low pass filter so that only the low frequency signals are used in the learning process. The output of the Q-filter 92 becomes the feed-forward control signal 64 for the next iteration, that is, for the next seek operation corresponding to the given seek length.

The control circuitry of FIG. 4A can be represented in the z-domain as shown in the equation of FIG. 4B, as well as the learning function L 86 may be analyzed and derived in the z-domain, where: Uffwd_{n+1}(z) is the feed-forward control signal vector at {n+1} iteration, and PES_{n+1}(z) is the position error signal vector at {n+1} iteration. Any suitable learning function L 86 may be employed in the embodiments of the present invention. In one embodiment, the learning function Lu 86 is derived as shown in FIG. 4C:

$$Lu(z)=(\sigma_{re}^2/(n\cdot\sigma_{re}^2+\sigma_{ne}^2))\cdot TRC0(z)^{-1}$$

where:
TRC0(z) is a nominal model of a torque rejection curve TRC(z) for the VCM;
n is an index of a current iteration;
$\sigma_{re}$ is an estimated variance of a repeatable part of the PES_{i} over i iterations; and
$\sigma_{ne}$ is an estimated variance of a non-repeatable part of the PES_{i} over i iterations.

In the case when the filter Lu(z) is non-causal, the filtering may be done with the input viewed as a periodic sequence that repeats itself.

In one embodiment, the torque rejection curve TRC(z) for the VCM is defined as

G/(1−GC).

In one embodiment, the Q-filter 92 (Qu) is selected such that

Qu(z)[1−Lu(z)·TRC(z)]

comprises an infinity norm smaller than one for the real torque rejection curve TRC(z) so that the iterative learning loop is stable.

FIG. 5A shows an embodiment of the present invention wherein the reference signal 66 is adjusted by a reference adjustment value 94 generated using an ILC algorithm. During a seek operation of a given seek length, the PES 72 is saved in a first memory location 96, and the reference adjustment value 94 is saved in a second memory location 98. The PES 72 saved in the first memory location 96 is filtered by a learning function 100 Lr and combined 102 with the reference adjustment value 94 saved in the second memory location 98. The result 104 of the combination is filtered by a Q-filter 106 Qr which determines which frequencies are emphasized in the learning process. In one embodiment, the Q-filter 106 is simply one (no effect), and in an alternative embodiment, the Q-filter 106 is an ideal low pass filter so that only the low frequency signals are used in the learning process. The output of the Q-filter 106 becomes the reference adjustment value 94 for the next iteration, that is, for the next seek operation corresponding to the given seek length.

The control circuitry of FIG. 5A can be represented in the z-domain as shown in the equation of FIG. 5B, as well as the learning function L 100 may be analyzed and derived in the z-domain, where R_{n+1}(z) is the reference signal vector at {n+1} iteration, and PES_{n+1}(z) is the position error signal vector at {n+1} iteration. Any suitable learning function L 100 may be employed in the embodiments of the present invention. In one embodiment, the learning function Lr 100 is derived as shown in FIG. 5C:

$$Lr(z)=(\sigma_{re}^2/(n\cdot\sigma_{re}^2+\sigma_{ne}^2))\cdot ERC0(z)^{-1}$$

where:
ERC0(z) is a nominal model of an error rejection curve ERC(z) for the VCM;
n is an index of a current iteration;
$\sigma_{re}$ is an estimated variance of a repeatable part of the PES_{i} over i iterations; and
$\sigma_{ne}$ is an estimated variance of a non-repeatable part of the PES_{i} over i iterations.

In the case when the filter Lr(z) is non-causal, the filtering may be done with the input viewed as a periodic sequence that repeats itself.

In one embodiment, the error rejection curve ERC(z) is defined as

1/(1−GC).

In one embodiment, the Q-filter 106 (Qr) is selected such that

Qr(z)[1−Lr(z)·ERC(z)]

comprises an infinity norm smaller than one for the real error rejection curve ERC(z) so that the iterative learning loop is stable.

FIG. 5D shows an embodiment of the present invention wherein the reference signal 66 is adjusted by a reference adjustment value 94 generated using an ILC algorithm, and a feed-forward control signal 108 is combined with a feed-back control signal 76 to generate the VCM control signal 80. In one embodiment, the feed-forward control signal 108 is predetermined based on suitable performance criteria (such as resonance excitation). For example, the feed-forward control signal 108 may be predetermined for a family of disk drives based on design parameters of the VCM 36 and then employed in every production disk drive. In one embodiment, the feed-forward control signal 108 is adjusted within each production disk drive to meet terminal seek conditions, such as a terminal position and/or a terminal velocity condition. Further details of how the feed-forward control signal 108 may be adjusted to meet terminal seek conditions are disclosed in U.S. Pat. No. 6,636,377 the disclosure of which is incorporated herein by reference.

The ILC algorithm may be executed to adjust at least one of the feed-forward control signal and/or the reference control signal during any suitable phase of the manufacturing process of a disk drive, as well as while the disk drive is deployed in the field. In one embodiment, the ILC algorithm is executed for a subset of disk drives during a design phase, wherein the results are averaged to generate nominal values copied to each production disk drive. In another embodiment, the ILC algorithm is executed during a manufacturing process for each production disk drive, wherein the results are saved in a non-volatile memory (e.g., a flash memory or on the disk) for use during normal operation. In yet another embodiment, the ILC algorithm is executed while the disk drive is deployed in the field so as to update at least one of the feed-forward control signal and/or the reference signal during normal seek operations. The updated values are saved in a non-volatile memory for use during subsequent seek operations.

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller, or certain steps described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:

1. A disk drive comprising:
   disk;
   an actuator arm;
   a head coupled to a distal end of the actuator arm;
   a voice coil motor (VCM) for rotating the actuator arm about a pivot; and
   control circuitry operable to seek the head from a first radial location over the disk to a second radial location over the disk by:
   initializing a reference signal;
   initializing a feed-forward control signal;
   initiating the seek;
   generating and saving a position error signal (PES) representing a position error of the head relative to the reference signal;
   filtering the PES with a compensation filter to generate a feed-back control signal;
   combining the feed-back control signal with the feed-forward control signal to generate a VCM control signal; and
   after the seek, processing the saved PES using an iterative learning control (ILC) algorithm to adjust at least one of the reference signal and the feed-forward control signal.

2. The disk drive as recited in claim 1, wherein the ILC algorithm adjusts the feed-forward control signal according to:

Uffwd_{n+1}(z)=Qu(z)[Uffwd_{n}(z)+Lu(z)PES_{n+1}(z)]

where:
   Uffwd_{n+1}(z) is the feed-forward control signal vector at {n+1} iteration; and
   PES_{n+1}(z) is the position error signal vector at {n+1} iteration.

3. The disk drive as recited in claim 2, wherein:

Lu(z)=($\sigma_{re}^2$/(n·$\sigma_{re}^2$+$\sigma_{ne}^2$))·TRC0(z)$^{-1}$ where:
   TRC0(z) is a nominal model of a torque rejection curve TRC(z) for the VCM;
   n is an index of a current iteration;
   $\sigma_{re}$ is an estimated variance of a repeatable part of the PES_{i} over i iterations; and
   $\sigma_{ne}$ is an estimated variance of a non-repeatable part of the PES_{i} over i iterations.

4. The disk drive as recited in claim 2, wherein Qu(z) is one.

5. The disk drive as recited in claim 3, wherein Qu(z) is a filter such that Qu(z)[1−Lu(z)·TRC(z)]

comprises an infinity norm smaller than one so that the iterative learning loop is stable.

6. The disk drive as recited in claim 1, wherein the ILC algorithm adjusts the reference signal according to:

R_{n+1}(z)=Qr(z)[R_{n}(z)+Lr(z)PES_{n+1}(z)]

where:
R_{n+1}(z) is the reference signal vector at {n+1} iteration; and
PES_{n+1}(z) is the position error signal vector at {n+1} iteration.

7. The disk drive as recited in claim 6, wherein:

$$Lr(z)=(\sigma_{re}^2/(n\cdot\sigma_{re}^2+\sigma_{ne}^2))\cdot ERC0(z)^{-1}$$

where:
ERC0(z) is a nominal model of an error rejection curve ERC(z) for the VCM;
n is an index of a current iteration;
$\sigma_{re}$ is an estimated variance of a repeatable part of the PES_{i} over i iterations; and
$\sigma_{ne}$ is an estimated variance of a non-repeatable part of the PES_{i} over i iterations.

8. The disk drive as recited in claim 6, wherein Qr(z) is one.

9. The disk drive as recited in claim 7, wherein Qr(z) is a filter such that $$Qr(z)[1-Lr(z)\cdot ERC(z)]$$

comprises an infinity norm smaller than one so that the iterative learning loop is stable.

10. A method of operating a disk drive, the disk drive comprising a disk, an actuator arm, a head coupled to a distal end of the actuator arm, and a voice coil motor (VCM) for rotating the actuator arm about a pivot, the method comprising:
initializing a reference signal;
initializing a feed-forward control signal;
initiating a seek;
generating and saving a position error signal (PES) representing a position error of the head relative to the reference signal;
filtering the PES with a compensation filter to generate a feed-back control signal;
combining the feed-back control signal with the feed-forward control signal to generate a VCM control signal; and
after the seek, processing the saved PES using an iterative learning control (ILC) algorithm to adjust at least one of the reference signal and the feed-forward control signal.

11. The method as recited in claim 10, wherein the ILC algorithm adjusts the feed-forward control signal according to:

$$Uffwd\_\{n+1\}(z)=Qu(z)[Uffwd\_n(z)+Lu(z)PES\_\{n+1\}(z)]$$

where:
Uffwd_{n+1}(z) is the feed-forward control signal vector at {n+1} iteration; and
PES_{n+1}(z) is the position error signal vector at {n+1} iteration.

12. The method as recited in claim 11, wherein:

$$Lu(z)=(\sigma_{re}^2/(n\cdot\sigma_{re}^2+\sigma_{ne}^2))\cdot TRC0(z)^{-1}$$

where:
TRC0(z) is a nominal model of a torque rejection curve TRC(z) for the VCM;
n is an index of a current iteration;
$\sigma_{re}$ is an estimated variance of a repeatable part of the PES_{i} over i iterations; and
$\sigma_{ne}$ is an estimated variance of a non-repeatable part of the PES_{i} over i iterations.

13. The method as recited in claim 11, wherein Qu(z) is one.

14. The method as recited in claim 12, wherein Qu(z) is a filter such that $$Qu(z)[1-Lu(z)\cdot TRC(z)]$$

comprises an infinity norm smaller than one so that the iterative learning loop is stable.

15. The method as recited in claim 10, wherein the ILC algorithm adjusts the reference signal according to:

$$R\_\{n+1\}(z)=Qr(z)[R\_\{n\}(z)+Lr(z)PES\_\{n+1\}(z)]$$

where:
R_{n+1}(z) is the reference signal vector at {n+1} iteration; and
PES_{n+1}(z) is the position error signal vector at {n+1} iteration.

16. The method as recited in claim 15, wherein:

$$Lr(z)=(\sigma_{re}^2/(n\cdot\sigma_{re}^2+\sigma_{ne}^2))\cdot ERC0(z)^{-1}$$

where:
ERC0(z) is a nominal model of an error rejection curve ERC(z) for the VCM;
n is an index of a current iteration;
$\sigma_{re}$ is an estimated variance of a repeatable part of the PES_{i} over i iterations; and
$\sigma_{ne}$ is an estimated variance of a non-repeatable part of the PES_{i} over i iterations.

17. The method as recited in claim 15, wherein Qr(z) is one.

18. The method as recited in claim 16, wherein Qr(z) is a filter such that $$Qr(z)[1-Lr(z)\cdot ERC(z)]$$

comprises an infinity norm smaller than one so that the iterative learning loop is stable.

* * * * *